United States Patent
Paterik et al.

(10) Patent No.: US 8,059,790 B1
(45) Date of Patent: Nov. 15, 2011

(54) NATURAL-LANGUAGE SURVEILLANCE OF PACKET-BASED COMMUNICATIONS

(75) Inventors: Thomas L. Paterik, Kansas City, MO (US); Farni B. Weaver, Spring Hill, KS (US); Irwin Joseph Butac Acosta, Kansas City, MO (US); Philip M. Kunkel, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 1260 days.

(21) Appl. No.: 11/555,584

(22) Filed: Nov. 1, 2006

Related U.S. Application Data

(63) Continuation-in-part of application No. 11/475,285, filed on Jun. 27, 2006.

(51) Int. Cl.
*H04M 1/64* (2006.01)

(52) U.S. Cl. .... 379/88.02; 370/352; 379/38; 379/93.03; 379/201.01; 455/414.1; 704/270; 704/270.1; 704/273; 709/201; 709/224; 709/231

(58) Field of Classification Search .......... 340/5.1–5.25, 340/5.8–5.85, 3.1, 3.3–3.32, 3.5–3.9; 370/351–356, 370/259–271; 379/67.1–88.28, 201.01, 207.13, 379/235, 265.07, 7, 38, 48, 93.01–93.04, 379/93.26–93.37, 101.01, 106.01–106.08, 379/201.11, 211.01, 338, 339; 455/410–417; 704/246–257, 270–278; 709/201–203, 206, 709/207, 217–219, 224–229, 231, 232, 239, 709/240, 243, 244; 348/14.01–14.16
See application file for complete search history.

(56) References Cited

U.S. PATENT DOCUMENTS

| | | | |
|---|---|---|---|
| 5,347,572 A | 9/1994 | Avni | |
| 5,438,570 A | 8/1995 | Karras et al. | |
| 5,897,616 A * | 4/1999 | Kanevsky et al. | 704/246 |
| 5,923,744 A | 7/1999 | Cheng | |
| 5,943,393 A | 8/1999 | Howell | |
| 6,311,159 B1 * | 10/2001 | Van Tichelen et al. | 704/275 |
| 6,324,279 B1 | 11/2001 | Kalmanek, Jr. et al. | |
| 6,438,695 B1 | 8/2002 | Maufer | |
| 6,496,483 B1 | 12/2002 | Kung et al. | |
| 6,505,157 B1 * | 1/2003 | Elworthy | 704/257 |
| 6,553,025 B1 | 4/2003 | Kung et al. | |
| 6,600,733 B2 | 7/2003 | Deng | |
| 6,785,651 B1 * | 8/2004 | Wang | 704/246 |
| 7,035,386 B1 * | 4/2006 | Susen et al. | 379/93.02 |
| 7,055,174 B1 | 5/2006 | Cope et al. | |

(Continued)

OTHER PUBLICATIONS

Hobbs, "The Role and Structure of a Theory of Discourse," Sep. 5, 2003.

(Continued)

*Primary Examiner* — Hemant Patel

(57) ABSTRACT

Methods and systems are provided for natural-language surveillance of packet-based communications. Speech data is received, representing at least part of a speech session. The speech data is compared with at least one speech-characteristics profile in an automated manner. The comparing step comprises using natural-language-processing (NLP) to compare the speech data with the profiles on at least one of a lexical level, a syntactic level, a semantic level, a discourse level, and a pragmatic level. It is determined in an automated manner whether the speech data matches any of the profiles. If the speech data matches at least one profile, an indication that the speech data matches the at least one matching profile is responsively stored.

12 Claims, 5 Drawing Sheets

U.S. PATENT DOCUMENTS

| | | | |
|---|---|---|---|
| 7,076,527 B2 * | 7/2006 | Bellegarda et al. | 709/206 |
| 7,440,900 B2 * | 10/2008 | Chang | 704/275 |
| 2002/0051463 A1 | 5/2002 | Higuchi | |
| 2002/0087316 A1 * | 7/2002 | Lee et al. | 704/257 |
| 2002/0184031 A1 * | 12/2002 | Brittan et al. | 704/260 |
| 2003/0023437 A1 * | 1/2003 | Fung | 704/236 |
| 2004/0186730 A1 * | 9/2004 | Sun et al. | 704/277 |
| 2004/0199596 A1 * | 10/2004 | Nutkis | 709/207 |
| 2004/0249636 A1 * | 12/2004 | Applebaum et al. | 704/231 |
| 2005/0132414 A1 | 6/2005 | Bentley et al. | |
| 2006/0053010 A1 * | 3/2006 | Chapman et al. | 704/235 |
| 2006/0067497 A1 * | 3/2006 | Erhart et al. | 379/201.01 |
| 2006/0149558 A1 * | 7/2006 | Kahn et al. | 704/278 |
| 2006/0217136 A1 | 9/2006 | Bantukul et al. | |
| 2006/0293876 A1 * | 12/2006 | Kamatani et al. | 704/2 |

OTHER PUBLICATIONS

Liddy, "Natural Language Processing," 2001.

ADC Adaptive Communications—SMserver, IP CALEAserver, http://www.adc-adapts.com/Products/ipscaleaserver/architecture.cfm, from World Wide Web on Feb. 21, 2001.

ADC Adaptive Communications—SMserver, IP CALEAserver, http://www.adc-adapts.com/Products/ipscaleaserver/features.cfm, from World Wide Web on Feb. 21, 2001.

ADC Adaptive Communications—SMserver, IP CALEAserver, http://www.adc-adapts.com/Products/ipscaleaserver/overview.cfm, from World Wide Web on Feb. 21, 2001.

Castle, "Multi-Billion Pound Global Surveillance," http://www.cephasministry.com/nwo_digital_monitoring.html, Jan. 28, 2000.

"Diaphonics—FAQ," http://www.diaphonics.com/faq.php, printed Feb. 28, 2006.

NewNet Product Family, NewNet IP CALEserver, http://www.newnet.com/products/ipcaleaserver/, printed from the World Wide Web on Jan. 8, 2001.

U.S. Appl. No. 11/475,285, filed Jun. 27, 2006 in the name of Weaver et al., entitled "Using Voiceprint Technology in CALEA Surveillance".

Non-Final Office Action from U.S. Appl. No. 11/475,285, mailed Jul. 12, 2010.

Final Office Action from U.S. Appl. No. 11/475,285, mailed Nov. 18, 2010.

Non-Final Office Action from U.S. Appl. No. 09/793,176, mailed Sep. 7, 2004.

Final Office Action from U.S. Appl. No. 09/793,176, mailed Feb. 8, 2005.

Advisory Action from U.S. Appl. No. 09/793,176, mailed Apr. 18, 2005.

Non-Final Office Action from U.S. Appl. No. 09/793,176, mailed Aug. 5, 2005.

Notice of Allowance from U.S. Appl. No. 09/793,176, mailed Jan. 9, 2006.

* cited by examiner

NATURAL-LANGUAGE SURVEILLANCE OF PACKET-BASED COMMUNICATIONS

CROSS-REFERENCE TO RELATED APPLICATIONS

This application is a continuation-in-part of U.S. patent application Ser. No. 11/475,285, entitled "Using Voiceprint Technology in CALEA Surveillance," which was filed on Jun. 27, 2006, and is incorporated herein by reference.

BACKGROUND

1. Technical Field

The present invention relates to packet-based communication sessions, such as Voice over Internet Protocol (VoIP) sessions, and, more particularly, to conducting surveillance with respect to such sessions.

2. Description of Related Art

Given the recent rise in popularity of the Internet and packet-switched communications generally, it is becoming more and more common for people to engage in packet-based, real-time media sessions over packet-switched networks rather than, for example, more traditional circuit-switched telephone communication sessions. These real-time media sessions may take the form of VoIP sessions, and/or any other type of real-time media sessions. To engage in these sessions, communication devices may use a packet-switched protocol such as the Internet Protocol (IP), relevant aspects of which are described in "Internet Protocol," RFC 791 (September 1981), which is incorporated herein by reference.

Certain types of media sessions, such as VoIP sessions, may be set up using a protocol such as the Session Initiation Protocol (SIP), relevant aspects of which are described in Rosenberg et al., "SIP: Session Initiation Protocol," RFC 3261 (June 2002), which is incorporated herein by reference. The SIP messages involved in setting up these sessions may include description of one or more parameters of those sessions according to a protocol such as the Session Description Protocol (SDP), relevant aspects of which are described in Handley and Jacobson, "SDP: Session Description Protocol," RFC 2327 (April 1998), which is incorporated herein by reference.

Once the session parameters have been agreed upon by the session participants, the session may be conducted using a bearer protocol—and via one or more bearer elements such as routers, switches, media servers, media gateways, etc.—such as the Real-time Transport Protocol (RTP), relevant aspects of which are described in Schulzrinne et al., "RTP: A Transport Protocol for Real-Time Applications," RFC 3550 (July 2003), which is incorporated herein by reference. Many other protocols may used instead of or in addition to SIP, SDP, and RTP, however.

With respect to communication sessions in general, whether they be circuit-switched or packet-switched, it sometimes occurs that law-enforcement agencies need to and are authorized to monitor them. Along these lines, on Oct. 25, 1994, the United States government enacted the Communications Assistance for Law Enforcement Act (CALEA) to clarify the duty of telecommunications carriers to cooperate in monitoring communications for law-enforcement purposes. CALEA requires these carriers (e.g., telephone companies, wireless service providers, etc.) to make available both call content (voice signals) and call data (digits dialed, length of call, etc.) to requesting law-enforcement agencies in response to a valid court order.

Among the known techniques for conducting surveillance of communications are speaker verification and speaker identification. Speaker verification refers to comparing a voice sample against a stored digital representation—often known as a voiceprint—of a person's voice, for the purpose of verifying the identity of the speaker. This is often most useful alongside some identity-corroborating data, such as a name, account number, and the like. Speaker identification involves comparing a voice sample against multiple voiceprints, to determine the identity of the speaker, and is often used when no identity-corroborating data is available.

However, it may also happen that a target of surveillance may not convey his or her actual voice during a communication session, perhaps in an effort to avoid the voiceprint analysis mentioned above. This could occur if, for example, the target communicated using instant messaging (IM) or in a chat room. The target could also use a computer-generated voice, perhaps produced in part by text-to-speech (TTS) technology, or perhaps by a combination of speech-to-text (STT) technology and TTS technology. Still another example might involve a target using a device to garble or distort his or her voice. And other examples are certainly possible, each of which may render voiceprint-matching strategies ineffective.

SUMMARY

Methods and systems are provided for natural-language surveillance of packet-based communications. In one aspect, an exemplary embodiment of the present invention may take the form of a method. In accordance with the method, speech data is received, representing at least part of a speech session. The speech data is compared with at least one speech-characteristics profile in an automated manner. The comparing step comprises using NLP to compare the speech data with the profiles on at least one of a lexical level, a syntactic level, a semantic level, a discourse level, and a pragmatic level. It is determined in an automated manner whether the speech data matches any of the profiles. If the speech data matches at least one profile, an indication that the speech data matches the at least one matching profile is responsively stored.

These as well as other aspects and advantages will become apparent to those of ordinary skill in the art by reading the following detailed description, with reference where appropriate to the accompanying drawings.

BRIEF DESCRIPTION OF THE DRAWINGS

Various exemplary embodiments are described herein with reference to the following drawings, wherein like numerals denote like entities.

DETAILED DESCRIPTION OF EXEMPLARY EMBODIMENTS

1. Overview

Figure 1:
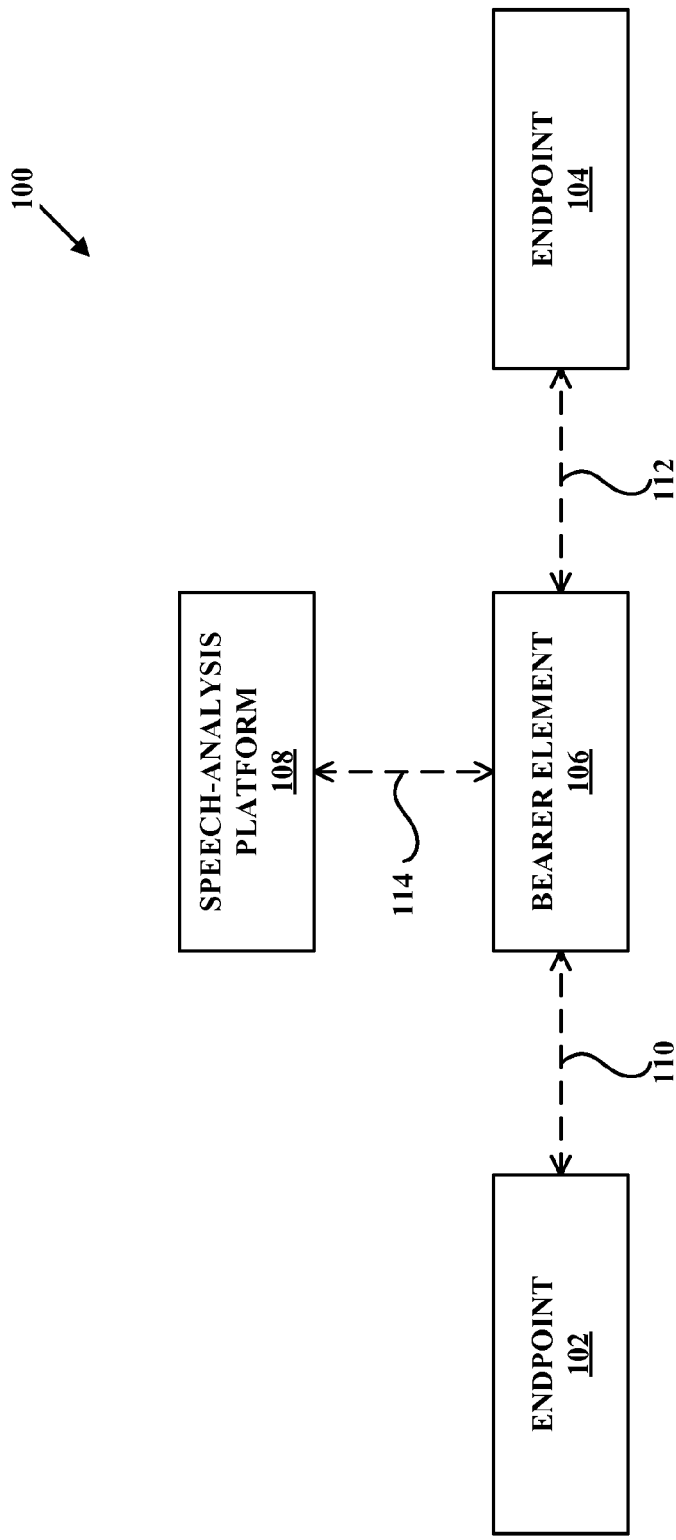
FIG. 1 is a simplified block diagram of a communication system that may be used in accordance with exemplary embodiments.

To reduce the ability of surveillance targets to circumvent lawful monitoring, the present invention involves using natural-language-processing (NLP) to compare the oral and/or written speech of a communication session against speech-characteristics profiles. NLP involves analysis of speech on multiple levels, referred to as the phonological, morphological, lexical, syntactic, semantic, discourse, and pragmatic levels. Note that natural language understanding (NLU) is a discipline that is related to NLP, and that NLP as used herein encompasses both NLP and NLU.

Essentially, NLP involves analyzing what language a speaker chooses to use, and how they use that language, rather than focusing only on what the speaker's voice sounds like. As stated above, surveillance often focuses on just that, using voiceprint analysis to identify a communication-session participant as a target of surveillance. In situations where a target communicates without conveying what their voice sounds like—such as when a target communicates textually (e.g. using e-mail, IM, chat rooms, etc.), using a computer-generated voice (e.g. using STT technology), or by using a voice-altering technology, voiceprint analysis may not prove effective in conducting surveillance.

Thus, the present invention contemplates application of NLP to various types of communication sessions for the purpose of conducting lawful surveillance. Among the types of communication that may be monitored at least in part through application of NLP analysis are e-mail, IM, chat rooms, VoIP calls, and circuit-switched telephone calls. In the latter case, STT technology may prove useful in converting spoken language into textual representations to which NLP analysis may be applied. Note that this monitoring may take place in real-time—perhaps to identify a particular communication session as involving a target of surveillance—or in non-real-time—perhaps to assess whether or not a recorded conversation or IM session involved a target of surveillance. And many other applications of the present invention are possible as well.

The above-listed types of communication to which the present invention applies will generally be referred to herein as speech sessions. And the present invention certainly applies to types of speech sessions other than those explicitly listed herein. That is, the principles of the present invention apply to any context in which one or more people produce spoken or written language that can be analyzed under NLP principles.

The NLP analysis that will be conducted with respect to these speech sessions is analogous to the voiceprint-analysis context in that communication-session data is compared with previously-stored profiles in an attempt to find a match between the communication-session data and at least one such profile. However, where voiceprint profiles contain data with respect to what a particular person's voice sounds like, the profiles used in connection with exemplary embodiments of the present invention contain data that reflects how, in a characteristic manner, a particular person or group of people uses language—in other words, what they choose to say, and how they choose to say it, not just how they sound when they say whatever they say.

Note that these profiles, referred to herein as speech-characteristics profiles, may well include data that reflects how a particular person's voice sounds. The description herein of speech-characteristics profiles—or NLP-speech-characteristics profiles—is not meant to exclude that type of data. However, in a more general sense, the speech-characteristics profiles would include certain other types of data, and may or may not include data about the sound of a particular target's voice.

As stated above, NLP involves analyzing speech on multiple levels, referred to as the phonological, morphological, lexical, syntactic, semantic, discourse, and pragmatic levels. Briefly, the phonological level relates to how people pronounce speech sounds, the morphological level relates to how people use word parts known as morphemes, the lexical level relates to word usage, the syntactic level relates to how people put together phrases and sentences, the semantic level relates to what meanings people assign to words and phrases, the discourse level relates to units of text longer than a single sentence (such as an e-mail, a conversation, etc.), and the pragmatic level relates to the overall context in which particular use of language takes place.

So, stated generally, the speech-characteristics profiles, which will be compared with speech-session data in accordance with the present invention, will preferably include data that represents the way in which a particular person or group of people uses language on as many of these NLP levels as possible. At a minimum, the present invention involves using profiles that represent how a particular person or group of people uses language on at least one of the lexical, syntactic, semantic, discourse, and pragmatic levels. Note that, as part of carrying out the present invention, one or more data collections referred to as grammars may be constructed, containing data that represents usage of language by one or more people on one or more NLP levels.

2. Exemplary Architecture a. Exemplary Communication System

FIG. 1 is a simplified block diagram of a communication system that may be used in accordance with exemplary embodiments. It should be understood that this and other arrangements described herein are set forth only as examples. Those skilled in the art will appreciate that other arrangements and elements (e.g., machines, interfaces, functions, orders, and groupings of functions, etc.) can be used instead, and that some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. Various functions may be carried out by a processor executing instructions stored in memory.

As shown in FIG. 1, the communication system 100 includes endpoints 102 and 104, a bearer element 106, and a speech-analysis platform 108. Endpoint 102 and bearer element 106 are able to communicate over a communication link 110; endpoint 104 and bearer element 106 are able to communicate over a communication link 112; bearer element 106 and speech-analysis platform 108 are able to communicate over a communication link 114. And more devices than those shown in FIG. 1 may be involved in carrying out exemplary embodiments of the present invention. For example, numerous switches, routers, networks, etc. may be involved.

The communication links 110, 112, and 114 are logical links that represent the fact that the entities joined by those links may communicate with each other over one or more packet-switched networks, one or more circuit-switched networks, one or more wired networks, one or more wireless networks, one or more private networks, and/or one or more public networks such as the Internet. These entities may communicate over telephone lines, or perhaps over data networks using IP communication, in which case they may be identified by one or more IP addresses.

In one embodiment, all four devices in FIG. 1 may be connected to the same packet-switched network, such as the Internet. In another embodiment, one or both of communication links 110 and 112 may be a circuit-switched telephone link, and bearer element 106 may not only connect those two communication links, but may also, perhaps in cooperation with one or more other entities, provide the content of one or more telephone calls to platform 108, perhaps making use of STT technology.

Endpoints 102 and 104 may be any type of communication devices capable of engaging in speech sessions, such as voice calls, VoIP calls, IM sessions, etc. As such, either or both of endpoint 102 and endpoint 104 could be a telephone, a mobile station such as a cellular telephone, a PDA, etc. Endpoints 102 and 104 may connect to bearer element 106 via communication links 110 and 112, respectively. As further examples, either or both of endpoint 102 and endpoint 104 could be a packet-based telephone, a computer, a media gateway, a server, a push-to-talk (PTT) server, or a conference server. Other possibilities exist as well.

Bearer element 106 may be a switch or network server—or any other device—having a communication interface such as a circuit-switched interface, an Ethernet interface, a processor, and data storage comprising instructions executable by the processor for carrying out the bearer-element functions described herein. As further examples, bearer element 106 could be or include a router, a media gateway, a media server, and/or a packet data serving node (PDSN). The bottom line is that endpoints 102 and 104 are capable of conducting a speech session with each other over communication link 110, bearer element 106, and communication link 112, and that bearer element 106 is capable of, perhaps in cooperation with other networks and/or entities making up all or part of communication link 114, providing copies of speech sessions to platform 108.

Speech-analysis platform 108 may be a network server—or any other suitable networking device—having a communication interface such as an Ethernet interface, a processor, and data storage comprising instructions executable by the processor for carrying out the speech-analysis-platform functions described herein. Speech-analysis platform 108 may also store at least one speech-characteristics profile for comparison with the speech data associated with various speech sessions. Speech-analysis platform 108 is described more fully in connection with FIG. 2.

b. Exemplary Media-Analysis Platform

Figure 2:
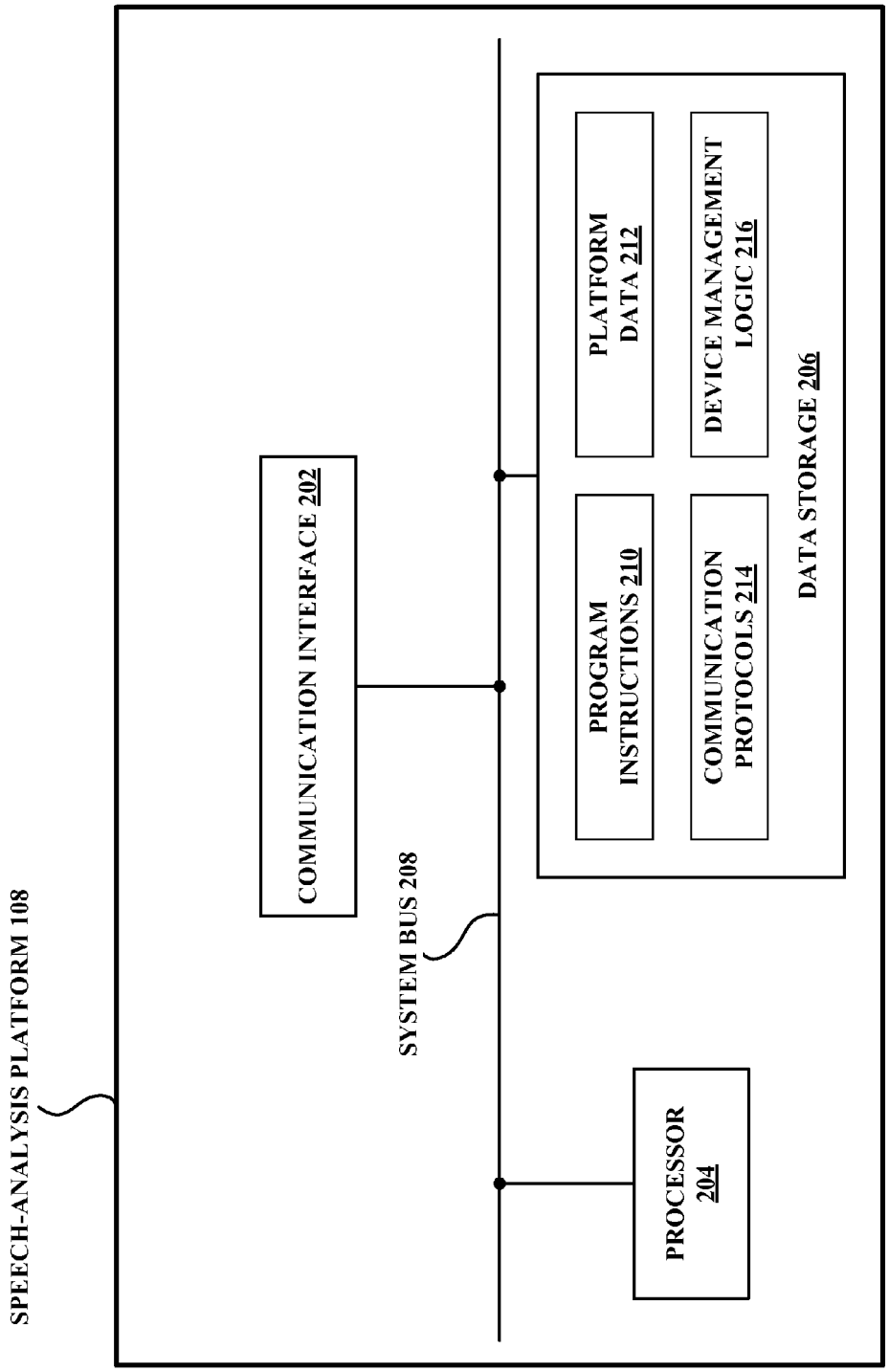
FIG. 2 is a simplified block diagram of an exemplary speech-analysis platform, which may be used in accordance with exemplary embodiments.

FIG. 2 is a simplified block diagram of an exemplary speech-analysis platform, which may be used in accordance with exemplary embodiments. In particular, FIG. 2 shows that speech-analysis platform 108 includes a communication interface 202, a processor 204, and data storage 206, all of which may be communicatively linked by a system bus 208. In general, speech-analysis platform 108 may be any networking device configured to carry out the speech-analysis-platform functions described herein. As examples, speech-analysis platform 108 could be a server, a switch, a router, a media server, and/or a media gateway.

Communication interface 202 may be any combination of hardware and software that platform 108 uses to communicate with bearer element 106. Communication interface 202 may thus include an Ethernet card and/or any other type of hardware or software. In some embodiments, platform 108 may communicate wirelessly with bearer element 106, in which case communication interface 202 may include a wireless-communication chipset and perhaps an antenna.

Processor 204 may comprise multiple (e.g., parallel) processors, such as a general purpose microprocessor and/or a discrete digital signal processor. Data storage 206 may take various forms, in one or more parts, such as a non-volatile storage block and/or a removable storage medium. Data storage 206 may store program instructions 210, platform data 212, communication protocols 214, and device management logic 216.

Program instructions 210 may be executable by processor 204 to carry out various speech-analysis-platform functions described herein. Platform data 212 may include correlations—such as the correlations described below in connection with FIG. 3—between NLP-speech-characteristics profiles and identities of targets of surveillance. Furthermore, platform data 212 may include any other types or combinations of data that facilitate carrying out exemplary embodiments, as well as any other types of data.

Communication protocols 214 may be useful to receive data from and send data to one or more network entities, and may include any protocols mentioned herein, any proprietary protocols, and/or any other protocols. Compatible protocols may be stored in other entities in communication with platform 108. Device management logic 216 may be used to manage aspects of platform 108 such as memory and file management.

c. Exemplary NLP-Speech-Characteristics Data

Figure 3:
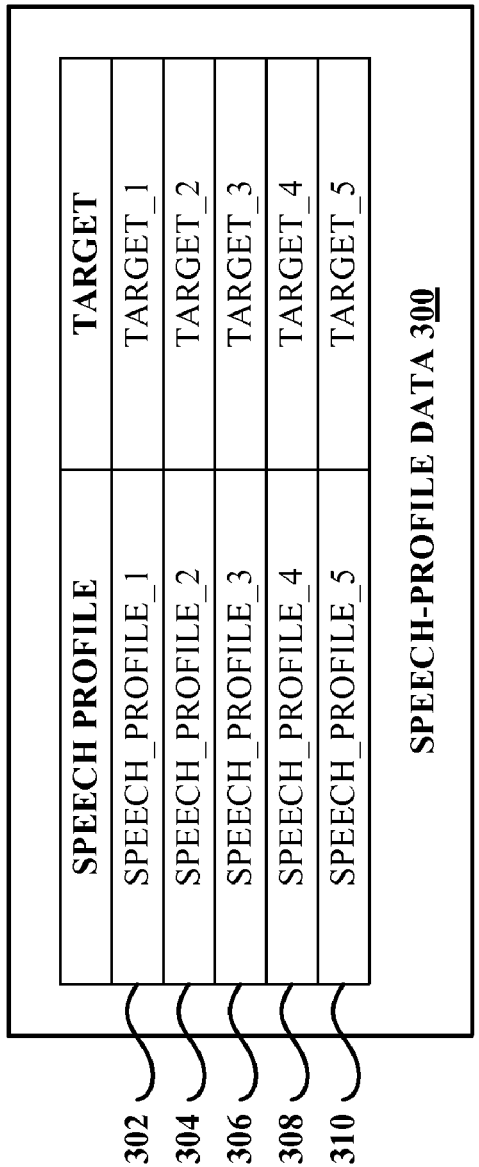
FIG. 3 is a simplified block diagram of exemplary NLP-speech-profile data, which may be used in accordance with exemplary embodiments.

FIG. 3 is a simplified block diagram of exemplary NLP-speech-profile data, which may be used in accordance with exemplary embodiments. In particular, FIG. 3 depicts a set of NLP-speech-profile data 300 that may be stored as platform data 212, and that correlates speech-characteristics profiles with identities of targets of surveillance. Speech-profile data 300 is merely an example of one way to correlate speech-characteristics profiles with surveillance-target identities, and other ways could be used as well without departing from the spirit and scope of the present invention.

Also, any number of correlations could be maintained: FIG. 3 depicts five as an example. Specifically, row 302 shows a speech-characteristics profile (represented as SPEECH_PROFILE_1) correlated with an identifier or identity of a first target of surveillance (represented as TARGET_1). Rows 304 through 310 show SPEECH_PROFILE_2 through SPEECH_ PROFILE_5 respectively associated with TARGET_2 through TARGET_5.

The NLP-speech-characteristics profiles maintained by platform 108 may take any of a number of forms known in the art for digitally representing characteristics of a particular person's speech. One example, discussed above, would be to include data that indicates how a particular person intones or inflects spoken or written language. Another example would be to include data that indicates how a particular person uses syntax and/or semantics, as well as data that represents speech at any one or any combination of the NLP levels discussed herein. Furthermore, any other types of data that indicate characteristics of a person's speech—in addition to or as opposed to voice—may be included instead or in addition.

Furthermore, the surveillance-target information maintained by platform 108 in speech-profile data 300 could take any of a number of forms as well. In general, this target data serves the purpose of identifying a particular target of surveillance, whether or not that target's actual identity is known. Thus, this data could include one or more names, one or more nicknames, one or more known associates, a social security number, one or more identifiers assigned to an at-that-time anonymous speech profile, and/or any other types of data. Note that any one of the targets could be a group of people, such as a criminal organization whose members have characteristic ways of using language.

3. Exemplary Operation a. A First Exemplary Method

Figure 4:
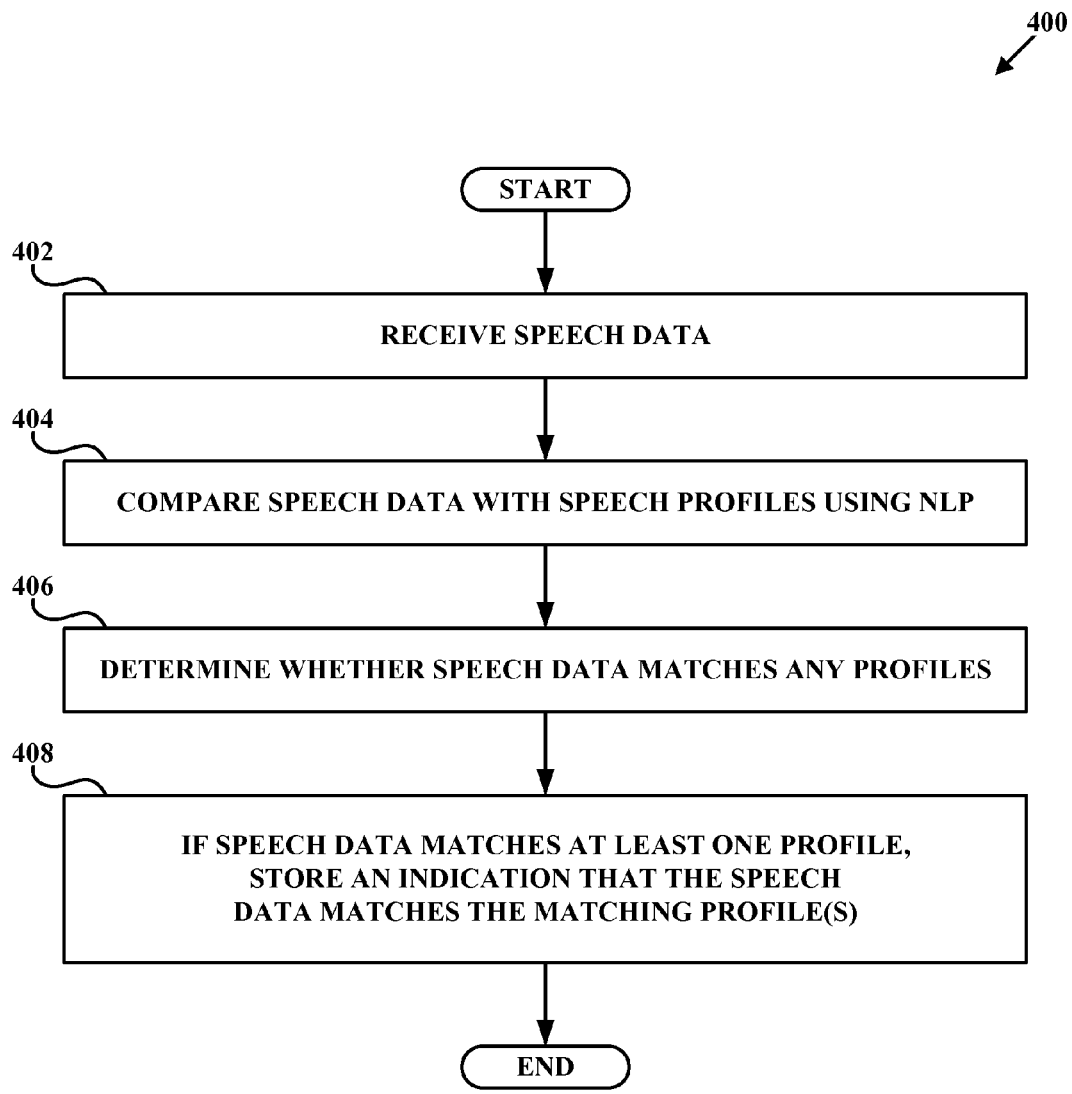
FIG. 4 is a flowchart of a first exemplary method that makes use of the communication system of FIG. 1, in accordance with exemplary embodiments.

FIG. 4 is a flowchart of a first exemplary method that makes use of the communication system of FIG. 1, in accordance with exemplary embodiments. As shown in FIG. 4, the method 400 begins at step 402, when speech-analysis platform 108 receives speech data representing at least part of a speech session. At step 404, platform 108 compares the speech data with at least one speech-characteristics profile in an automated manner. The comparing step comprises using NLP to compare the speech data with the profiles on at least one of the lexical level, the syntactic level, the semantic level, the discourse level, and the pragmatic level.

At step 406, platform 108 determines in an automated manner whether the speech data matches any of the profiles. At step 408, if the speech data matches at least one profile, platform 108 responsively stores an indication that the speech data matches the at least one matching profile. These steps are explained in the following subsections.

Note that method 400 is described as being carried out by platform 108; this is illustrative. Method 400, as well as other methods described herein, and the present invention as a general matter, may be carried out by platform 108, some other network entity, or perhaps some combination of more than one network entity.

i. Speech-Analysis Platform Receives Speech Data

At step 402, platform 108 receives speech data representing at least part of a speech session. Note that this speech data could be produced at least in part by a computer, TTS technology, STT technology, and/or voice-alteration technology. As one example, the speech session could be a telephone call or VoIP session in which one or more participants are conveying a computer-generated voice instead of conveying their own voice. Participants could be typing messages that are converted to audible signals using TTS techniques. Participants could also be speaking into a microphone, after which STT techniques could produce textual representations of what they are saying, at which point TTS techniques take over to again produce audible signals.

The speech session could also be a voice call or VoIP session during which one or more participants are using mechanical and/or electronic means to garble or distort their voice. Note that the speech session could also be a voice call or VoIP session during which one or more participants do convey their actual voices. As other possibilities, the speech session could be a recorded conversation, or perhaps a recorded voicemail or answering-machine message that is conveyed to platform 108. Other possibilities exist as well, such as the speech session not having an audio component, and being made up of textual communication only. Examples of this include IM, chat rooms, message-board postings, and e-mail. And still other possibilities exist for ways in which speech could be conveyed, without departing from the scope or spirit of the present invention.

ii. Compare Speech Data with Speech Profiles Using NLP

At step 404, platform 108 compares the speech data with at least one speech-characteristics profile in an automated manner. As an example, platform 108 may compare the speech data with one or more of the profiles shown in FIG. 3. Platform 108 uses NLP to compare the speech data with the profiles on the lexical, syntactic, semantic, discourse, and/or pragmatic levels, and preferably on all of them. Furthermore, platform 108 preferably also uses NLP to compare the speech data with the profiles 302-310 on the phonological and/or morphological levels, and again preferably on both.

(1) Lexical Level

With respect to the lexical level, the speech-characteristics profiles may include data that indicates tendencies of a particular target of surveillance with respect to choosing words to use. Thus, comparison at the lexical level may involve comparing at least one word represented by the speech data received at step 402 with the respective word-choice data of at least one profile.

Note that the profile data at the lexical level may indicate tendencies of a particular target with respect to using particular words as particular parts of speech. As an example, "wash" could be used as a noun or as a verb, and a certain target may tend to use it one way and not the other. Thus, use of the word in the characteristic part-of-speech manner may result in platform 108 increasing a running probability score as to whether or not a particular quantum of speech was produced by a particular target.

In general, platform 108 may keep track of a probability score for particular profiles when measured against particular sets of speech, and increase that score when the speech data reflects tendencies indicated by the profiles, and decrease the score when the speech data reflects tendencies that are not indicated by particular profiles, or contraindicated by certain profiles. After a complete analysis on as many NLP levels as possible, this overall probability score may be tested for statistical significance against some predetermined threshold, which may be influenced by external entities such as courts, governments, court orders, and/or any other entities.

The lexical level is concerned with terminology that a particular target may use. Thus, in building the speech-characteristics profile for a given target with respect to the lexical level, a database referred to as a grammar may be developed, where that grammar indicates words that particular targets use, and how they use them. The profiles may then contain references to this grammar. At the lexical level, the grammar would be made up of word-level data, while grammars at other levels would be made up of data that reflects the focus of those levels, such as sentence-structure at the syntactic level, definitional tendencies at the semantic level, phoneme pronunciation at the phonological level, word-part-usage at the morphological level, and so on.

One part of the analysis at the lexical level may reflect the fact that particular targets may tend to use non-English words in the midst of English sentences. This would be reflected in the target's profile, and speech data would be analyzed to identify this tendency. If that tendency were identified, that would increase the probability score for a given profile with respect to that speech session. Use of slang words or words such as "ain't" may also be used to raise the statistical significance of identifying a person or group. While such tendencies may not, taken alone, rise to the level of identifying characteristics, the way they are used, coupled with the other levels of language processing may add to the statistical accuracy of NLP-based identification.

(2) Syntactic Level

With respect to analysis at the syntactic level, the speech-characteristics profiles may include data that indicates tendencies of particular targets with respect to choosing ways of using syntax when producing speech. Thus, platform 108 may use NLP to compare the speech data received at step 402 with the profiles on the syntactic level at least in part by comparing at least one instance of syntax usage represented by the speech data with the respective syntax-choice data of at least one profile.

Analysis on the syntactic level may consider choice as to how to put sentences together, considering such things as pauses, commas, periods, and sentence structure. Syntactic analysis is concerned with structural dependency between words, often conveyed by the order in which words are arranged, which contributes to the meaning of particular sentences. Thus, the way in which a particular target tends to use syntax (i.e., the way they pause, hesitate, use commas, question marks, periods, etc.) may be characteristic, and can be profiled. Targets may have tendencies as to usage of sentence components such as noun phrases, verb phrases, prepositional phrases, etc. These tendencies can also be profiled and used to contribute to a probability score as to whether a given profile matches a given speech session to a predetermined statistical significance.

(3) Semantic Level

With respect to the semantic level, the speech-characteristics profiles may include data that indicates a particular target's tendencies with respect to semantic usage. Thus, platform 108 may compare the speech data received at step 402 with the profiles on the semantic level at least in part by comparing at least one instance of semantic usage represented by the speech data with the semantic-choice data of at least one profile.

The semantic level is concerned with what a particular target tends to mean when that target uses certain words or phrases. For example, it may be the case that some targets characteristically assign custom meanings to existing or invented words or phrases. These tendencies would be built into the profiles and would contribute to the analysis of particular speech sessions. Analysis at the semantic level involves resolving words or phrases that could have more than one meaning, to decide which meaning a speaker intended. This typically involves assigning probabilities to various definitions (including custom definitions) in the profiles.

As examples of words with multiple meanings, "mustang" could refer to a car, a horse, etc., while "coke" could refer to a drink, a drug, etc. Other words may also have conventional, everyday, non-criminal definitions, and also have particular definitions in a criminal context—some examples include "brick", "cake", and "powder". Analysis at the semantic level would, as stated, involve assigning probabilities to these various definitions, and perhaps others, to identify characteristics of a target's speech.

Thus, when a given word or phrase is detected in the speech session, the definition (or sense) of the word having the highest probability may be assumed to be what the speaker intended. Note that this may be updated by further analysis at the semantic level, and by analysis at other levels. In general, targets may have tendencies as to what they mean by various words, phrases, or sayings—these tendencies would be profiled and used for matching purposes at the semantic level.

(4) Discourse Level

With respect to the discourse level, the profiles may each include respective discourse-level data, indicating how particular targets tend to put overall speech sessions (i.e. texts) together. Thus, platform 108 may use NLP to compare the speech data received at step 402 with the profiles on the discourse level at least in part by comparing the speech data with the respective discourse-level data of at least one profile.

The discourse level is concerned with analyzing tendencies with respect to constructing multi-sentence quanta of speech, often referred to as texts. These quanta could be paragraphs, e-mails, IM sessions, conversations, segments of conversations, and/or any other multi-sentence quanta of speech. The analysis at this level is concerned with identifying connecting properties across sentence boundaries. For example, the discourse-level analysis may include resolving a pronoun in one sentence into a corresponding proper noun based on data from one or more other sentences. Thus, certain words or phrases in one sentence may be clarified at the discourse level by analysis of one or more other sentences.

As addressed above, NLP analysis often involves assigning probabilities to multiple possible senses or definitions of various words and phrases, and sentences in general. In NLP, this is often accomplished by using analytical constructs known as Statistical Language Models (SLMs). When the probability scores associated with a given sense of a given word, phrase, or sentence rises above a predetermined threshold, that particular sense is, in a sense, assigned to that word, phrase, or sentence. That assignment can then facilitate fixing assignment of senses to other units of speech. Analysis at the discourse level involves consideration of speech across sentence boundaries to work towards assignment of senses to these textual units.

In accordance with exemplary embodiments of the present invention, the profiled information at the discourse level would be tuned to specific people or groups (i.e., to specific targets of surveillance). This information would include classification of various patterns as to the way conversations flow for these targets. This group or individual-level discourse-level information is in contrast to NLP work that seeks to interpret language in light of how the largest-possible group of people uses language. That approach often involves analyzing huge amounts of language data, such as large news databases.

While that is certainly one approach, the present invention contemplates using not only those types of sources, but also profiling particular people and groups to the extent permitted by law (by, for example, valid court orders), so that the analysis is carried out along the lines of how those targets use language, not along the lines of how language is used in society on average. This will make surveillance conducted in accordance with the present invention more effective. Thus, the present invention contemplates building the speech-characteristics profiles through cooperation of speech scientists and criminal-profiling scientists, perhaps based on recordings and/or writings of various targets.

Furthermore, analysis at the discourse level may involve comparing (i) what may be considered "normal" usage of language (indicated by the large language databases (such as large news databases)) and (ii) how a particular target uses language. Thus, variance from "normal" language usage can be identified at the discourse level—as well as at perhaps one or more other of the levels described herein—as one or more anomalies that help to identify a particular target or targets.

(5) Pragmatic Level

With respect to the pragmatic level, the profiles may include respective pragmatic-level data, and platform 108 may use NLP to compare the speech data received at step 402 with the profiles on the pragmatic level at least in part by using this pragmatic-level data to inform the analysis to on at least one of the syntactic level, the semantic level, and the discourse level. Thus, pragmatic-level data may aid analysis on the other levels.

Analysis of speech on the pragmatic level is concerned mainly with context over contents of speech. That is, it springs from recognition that people use certain language that means one thing in one context, and something else in another. Said another way, speech often means more (or something different) than what the words simply say, when taken out of context.

Thus, the pragmatic-level data that may be used in accordance with the present invention is essentially a knowledge base that indicates one or more things about the context in which a given speech session is being conducted. For example, if it is known or suspected that a particular person is part of a gang that is involved in the drug trade, then this fact may be encoded into the knowledge base that is used to aid analysis on the pragmatic level. If, on the other hand, a suspected bank robber was a target of surveillance, then this fact could be encoded as part of the knowledge base.

This type of encoded knowledge-base information could then be used by, for example, the semantic level in assigning probabilities to various senses of particular words or phrases. This information could also be used at the syntactic level in assigning probabilities to various possible parts of speech that a speaker may have intended a particular word to have. Similarly, the pragmatic-level information could also be used at the discourse level to aid in the analysis of speech on a multi-sentence level. And many other possibilities exist as to how pragmatic, contextual information could inform the analysis of speech at one or more of the other levels of NLP analysis.

And more than one pragmatic-level profile could be tested against a given speech session. For example, a given speech session could be analyzed using two different pragmatic-level profiles (i.e., drug gang vs. bank robber). And it could be the case that whichever profile results in an overall higher level of statistical significance could be considered the matching profile for that speech session (or at least a better match). That is, a speech session may make more sense when viewed with one lens instead of another.

(6) Phonological Level

With respect to the phonological level, the profiles may include data that indicates tendencies of particular targets with respect to pronunciation. As such, platform 108 may compare the speech data received at step 402 with the profiles on the phonological level at least in part by comparing at least one instance of pronunciation represented by the speech data with the pronunciation data of at least one profile.

In general, the phonological level is concerned with the sounds of speech. As is known, words are composed of syllables. More fundamentally, syllables are each composed of one or more units of speech known as phonemes. The English language has about 44 known phonemes, each of which represent a distinct sound that can be pieced together with one or more other phonemes to produce syllables and words. As examples, some phonemes would include the "th" sound (e.g. at the end of "tooth"), the long "e" (e.g. in the middle of "weed"), the hard "k" (e.g. at the beginning of "kite" or "cat"), etc.

Furthermore, people can vary as to the way they pronounce various phonemes. These tendencies could be encoded in the speech-characteristics profiles, and occurrences of particular ways of pronouncing phonemes (or combinations of phonemes) could be used to increase a probability score as to whether a particular profile matches a particular speech session. As further examples of tendencies with respect to phoneme usage, some people pronounce the word "wash" to sound like "warsh," and some people pronounce the "s" at the end of words like "Illinois." These tendencies could be built into the profiles as identifying characteristics.

However, it should be noted that, when a person uses methods to disguise their speech, analysis on the phonological level becomes difficult, if not impossible. When a person uses computer-generated speech, analysis on the phonological level becomes essentially impossible. These are among the reasons that the present invention contemplates preferably conducting analysis on as many NLP levels as possible.

(7) Morphological Level

With respect to the morphological level, the profiles may include data that indicates tendencies of various targets as to word-part usage. As such, platform 108 may use NLP to compare the speech data with the profiles on the morphological level at least in part by comparing at least one instance of word-part usage represented by the speech data with the respective word-part-usage data of at least one profile.

In general, the morphological level is concerned with how people use morphemes, which are the smallest units of language that convey meaning. These units are parts of words, such as roots, prefixes, suffixes, and any other parts that convey meaning (such as the morpheme "-ed" conveying past tense). With respect to the present invention, one or more profiles may reflect that the associated targets tend to alter words in characteristic ways, such that detection of these characteristic alterations could increase the overall probability score that a given profile matches a given set of speech data.

iii. Determine Whether Speech Data Matches any Profiles

At step 406, platform 108 determines in an automated manner whether the speech data received at step 402 matches any of the profiles, based on the comparison carried out at step 404. As stated, the determination as to whether a given set of speech data matches a given profile may involve determining whether the speech data matches any of the profiles to a predetermined degree of statistical significance.

As explained herein, certain instances of the speech data matching the profiles in small ways, on the levels explained herein, are used to increase an overall probability score that the profile matches the speech data. Once this score rises above the predetermined degree of statistical significance, the profile may be considered a match for the speech data. This degree of statistical significance may vary depending on the circumstances, legal authorities, corroborating evidence, and/or any other factors.

iv. If Speech Data Matches any Profiles, Record that Information

At step 408, if the speech data matches at least one profile, platform 108 responsively stores an indication that the speech data matches the at least one matching profile. Note that this stored indication may then be used by law-enforcement officials and/or any other interested parties that have proper access to the information. Platform 108 may also responsively record the speech session associated with the speech data, alert a monitoring entity of the match between the speech data and the matching profile(s), and/or forward a copy of the associated speech session to a monitoring entity. And other steps could certainly be taken in response to detecting a match.

And it should be reiterated that voiceprint analysis is not meant to be excluded by the NLP analysis of the present invention. In some embodiments, voiceprint analysis may be carried out as part of the NLP analysis (i.e. at the phonological level). In other embodiments, voiceprint analysis may be carried out alongside the NLP analysis. And in still other embodiments, the NLP analysis may be carried out in response to determining that an attempt to carry out a voiceprint analysis of the speech data has failed.

b. A Second Exemplary Method

Figure 5:
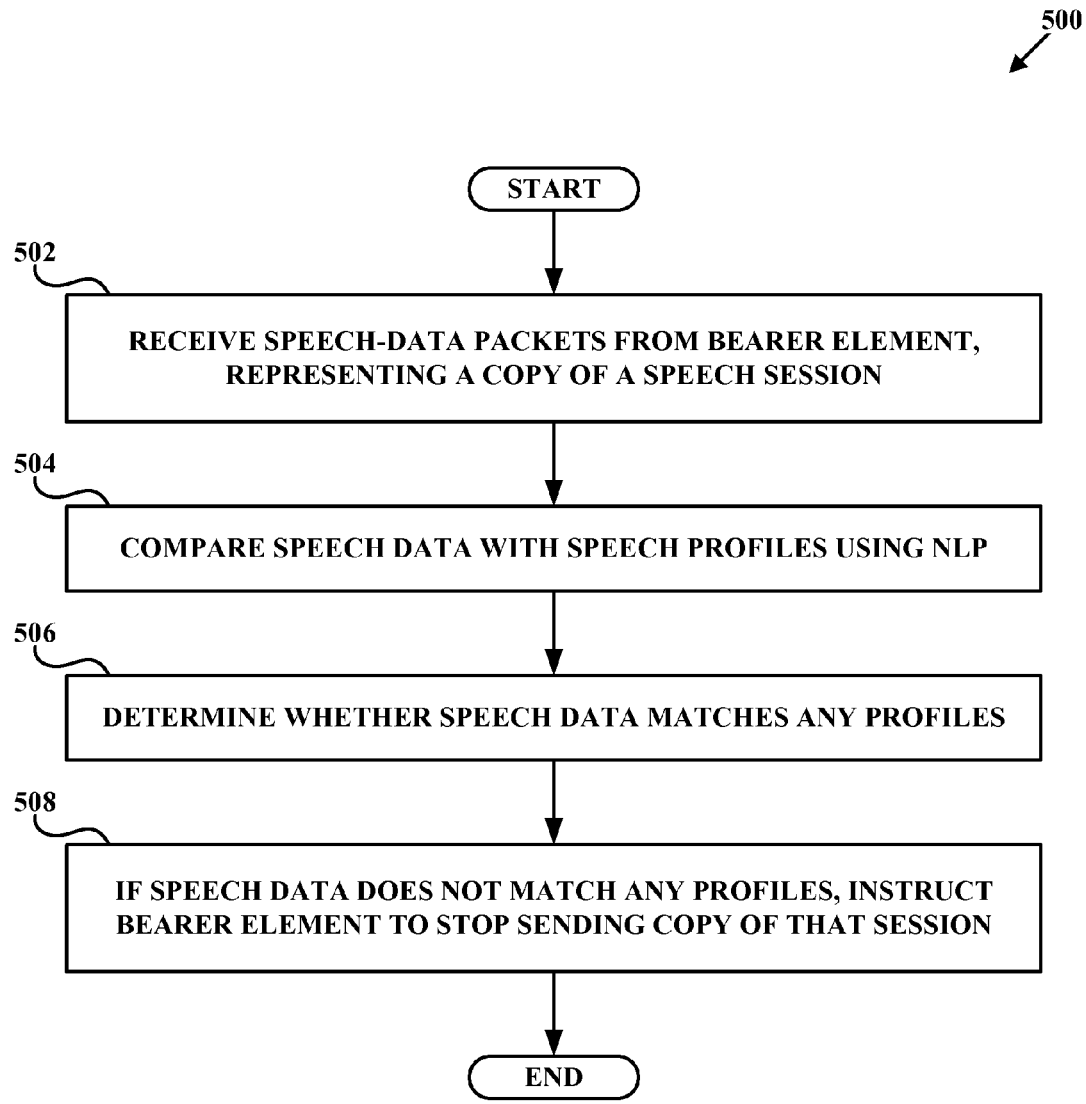
FIG. 5 is a flowchart of a first exemplary method that makes use of the communication system of FIG. 1, in accordance with exemplary embodiments.

FIG. 5 is a flowchart of a first exemplary method that makes use of the communication system of FIG. 1, in accordance with exemplary embodiments. Note that method 500 of FIG.

5 is similar in some aspects to method 400 of FIG. 4, and thus will not be described in as much detail. As shown in FIG. 4, method 500 begins at step 502, when platform 108 receives at least one packet from bearer element 106. Note that the at least one packet comprises speech data representing at least part of a speech session, and that bearer element 106 is configured to (i) initially send to platform 108 a copy of each of a plurality of speech sessions that traverse bearer element 106 and (ii) stop sending a copy of a particular session to platform 108 in response to receiving an instruction from platform 108.

The plurality of speech sessions—each of which bearer element 106 initially sends a copy of to platform 108—could be defined in any number of ways. Some non-limiting, potentially-overlapping examples are: the set of all sessions that originate in a particular geographic area, the set of all sessions that terminate in a particular geographic area, the set of all sessions that traverse bearer element 106, and the set of all sessions that traverse some other bearer element. In the latter case, bearer element 106 could recognize all sessions that have traversed some other switch, router, etc., and initially send a copy each of those sessions to platform 108.

At step 504, responsive to receiving the packets, platform 108 compares the speech data with at least one speech-characteristics profile maintained by platform 108. Each profile is associated with a target of surveillance, and the comparing step comprises using NLP to compare the speech data with the profiles on the lexical, syntactic, semantic, discourse, and/or pragmatic levels, as described herein. Note that comparison on the phonological and/or morphological levels could be performed as well. At step 506, platform 108 determines whether the speech data matches any of the profiles, as described herein. At step 508, if the speech data does not match any of the profiles, platform 108 responsively sends an instruction to bearer element 106 to stop sending the copy of the session to platform 108, and surveillance appropriately stops.

4. Conclusion

Various exemplary embodiments have been described above. Those skilled in the art will understand, however, that changes and modifications may be made to those examples without departing from the scope of the claims.

What is claimed is:

1. A method comprising:
   a speech-analysis platform receiving speech data representing at least part of a speech session;
   the speech-analysis platform comparing the speech data with each of at least one stored speech-characteristics profile in an automated manner, wherein each such profile is associated with a person that is a target of surveillance, wherein the comparing step comprises using natural-language-processing (NLP) to compare the speech data with the at least one stored speech-characteristics profile on each of a lexical level, a syntactic level, a semantic level, and a discourse level, wherein said using of NLP does not comprise conducting voiceprint analysis;
   the speech-analysis platform determining in an automated manner from said using of NLP whether the speech data matches any of the profiles; and
   if the speech-analysis platform determines from said using of NLP that the speech data matches at least one of the profiles on each of the lexical level, the syntactic level, the semantic level, and the discourse level, the speech-analysis platform responsively storing an indication that the speech data matches at least one of the profiles.

2. The method of claim 1, wherein the speech data was produced at least in part by at least one of a computer, a text-to-speech (TTS) technology, a speech-to-text (STT) technology, and a voice-alteration technology.

3. The method of claim 1, wherein the speech session comprises at least one of a telephone call, a voicemail message, an answering-machine message, a voice over Internet Protocol (VoIP) session, an instant-messaging (IM) session, a chat-room session, a message-board posting, and an e-mail.

4. The method of claim 1, wherein the profiles comprise respective word-choice data, and wherein using NLP to compare the speech data with the profiles on the lexical level comprises comparing at least one word represented by the speech data with the respective word-choice data of at least one profile.

5. The method of claim 1, wherein the profiles comprise respective syntax-choice data, and wherein using NLP to compare the speech data with the profiles on the syntactic level comprises comparing at least one instance of syntax usage represented by the speech data with the respective syntax-choice data of at least one profile.

6. The method of claim 1, wherein the profiles comprise respective semantic-usage data, and wherein using NLP to compare the speech data with the profiles on the semantic level comprises comparing at least one instance of semantic usage represented by the speech data with the respective semantic-choice data of at least one profile.

7. The method of claim 1, wherein the profiles comprise respective discourse-level data, wherein using NLP to compare the speech data with the profiles on the discourse level comprises comparing the speech data with the respective discourse-level data of at least one profile.

8. The method of claim 1, wherein the profiles comprise respective pragmatic-level data, the method further comprising using the respective pragmatic-level data of at least one profile to compare the speech data with the profiles on at least one of the lexical level, the syntactic level, the semantic level, and the discourse level.

9. The method of claim 1, wherein determining whether the speech data matches any of the profiles comprises determining whether the speech data matches any of the profiles to a predetermined degree of statistical significance.

10. The method of claim 1, further comprising conducting a voiceprint analysis of the speech data.

11. The method of claim 10, wherein the steps of claim 1 are carried out in response to a determination that the voiceprint analysis of the speech data has failed.

12. The method of claim 1, further comprising:
   if the speech-analysis platform determines that the speech data matches at least one of the profiles on each of the lexical level, the syntactic level, the semantic level, and the discourse level, the speech-analysis platform responsively further carrying out at least one of recording the speech session, alerting a monitoring entity of the match between the speech data and the at least one matching profile, and forwarding a copy of the speech session to a monitoring entity.

* * * * *